United States Patent [19]

Shichman et al.

[11] 3,963,394

[45] June 15, 1976

[54] BLADDER FOR SHAPING PNEUMATIC TIRE

[75] Inventors: Daniel Shichman, Trumbull, Conn.; Edward P. Percarpio, N. Haledon, N.J.

[73] Assignee: Uniroyal Inc., New York, N.Y.

[22] Filed: June 25, 1975

[21] Appl. No.: 599,225

[52] U.S. Cl. .................................. 425/51; 425/43
[51] Int. Cl.² ...................... B29H 3/042; B29H 5/02
[58] Field of Search .................. 425/33, 43, 49, 51, 425/52, 58

[56] References Cited
UNITED STATES PATENTS

| | | | |
|---|---|---|---|
| 2,730,763 | 1/1956 | Brundage | 425/33 |
| 3,171,162 | 3/1965 | Loderquist | 425/43 X |
| 3,640,653 | 2/1972 | Laenen | 425/33 |
| 3,645,655 | 2/1972 | Benze | 425/49 X |
| 3,830,679 | 8/1974 | Evans et al. | 425/52 X |

Primary Examiner—J. Howard Flint, Jr.
Attorney, Agent, or Firm—Lawrence E. Sklar

[57] ABSTRACT

An expandable bladder for shaping a pneumatic tire, comprising a thick, substantially cylindrical center section having a multiplicity of convolutions perpendicular to the axis of the cylindrical section on the inner surface of said section, said convolutions providing local reductions in thickness and additional axial extensibility to the bladder, a pair of annular, beaded end sections extending inwardly from each end of the cylindrical center section, and reinforcing material extending through the center section and end sections to limit the axial extensibility of the bladder. This abstract is not to be taken either as a complete exposition or as a limitation of the present invention, however, the full nature and extent of the invention being discernible only by reference to and from the entire disclosure.

12 Claims, 4 Drawing Figures

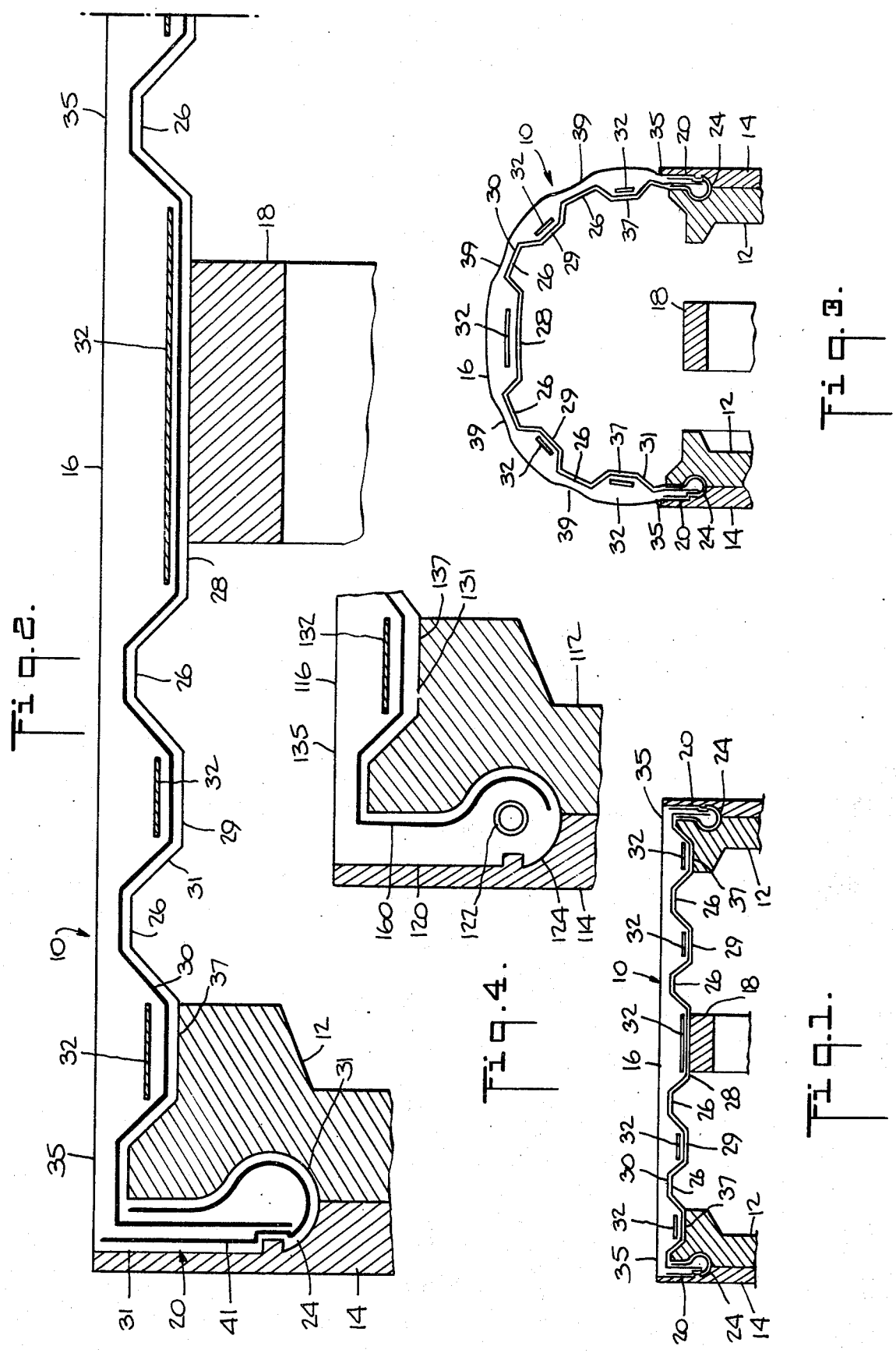

BLADDER FOR SHAPING PNEUMATIC TIRE

BACKGROUND OF THE INVENTION

The present invention relates to bladders used in tire building, and more particularly to shaping bladders used in conjunction with machines for building radial ply tires by the "two-stage" process or by the "single-stage" process, both known in the art.

Shaping uncured radial tire carcasses from a generally cylindrical shape to a toroidal shape during a tire building process is well known. Early efforts to do this involved the use of a simple, rubber-like cylinder, unreinforced by filamentous material, to support the carcass during shaping. This proved unsatisfactory in that inadequate support was provided to the carcass shaped thereon for the subsequent application and stitching of the breakers and tread, and symmetry of carcass stretch about the central plane of the tire perpendicular to the axis of the tire and circumferential uniformity of stretch in planes parallel to the central plane could not be assured and were seldom achieved.

Radial tires have been shaped without the use of any bladder, the logic being that since the uncured carcass was sufficiently impervious to air, it could itself be used as a shaping means by the simple expedient of sealing the tire beads to a support means and introducing air under pressure internal to the carcass. Once the carcass had been shaped, bell-shaped cylindrical supports, positioned at each bead of the carcass, would encompass the carcass at its outer diameter and provide support for the application and stitching of the breakers and tread. This method also proved unsatisfactory in that it was cumbersome, expensive, slow and produced expanded carcasses of the same unsatisfactory uniformity described above.

Some effort has been made to return to bladder shaping wherein the bladder is reinforced in order to make the bladder an effective support means. See, for example, U.S. Pat. No. 3,138,510 issued June 23, 1964. The reinforced bladder, however, has proved unsatisfactory because of the unyielding nature of the reinforcing materials used.

U.S. Pat. No. 3,144,374, issued Aug. 11, 1964, discloses "an annular membrane (shaping bladder) reinforced with longitudinal cables which are partially and elastically extensible, thus permitting, on the one hand, to impart to the membrane a cylindrical shape having sufficient rigidity for the manufacture of the carcass of the tire, when the membrane is stretched between the separated flanges of a drum, and, on the other hand, to give limited elongation to this membrane under the effect of the inflation pressure during the shaping operation, this elongation permitting the tension of the carcass of the tire to be increased". It is stated in the U.S. Pat. No. 3,144,374 that "the limited extensibility of the longitudinal cables of the membrane can be obtained, for example, by undulating the metal cables, or by using cables of synthetic wires or braids comprising a compressible or elastic central strand". It is important to note that the reinforcing longitudinal cables are utilized to provide both partial extensibility and rigidity to the membrane. The objective to be achieved by the use of the longitudinal, extensible cables is to permit sufficient outside development of the membrane in an axial direction in relation to the carcass of the tire so that the carcass is tensioned and its deformation is adequate. However, using the technique of the U.S. Pat. No. 3,144,374 it is difficult to accurately control the axial extension of the reinforcing cables. The instant invention does not rely on any cables to provide extensibility to the bladder.

It should be noted that the U.S. Pat. No. 3,144,374 uses cables to give both rigidity and a limitation of stretch, presumably distributed along the length of the cables. The instant invention, as will more fully appear below, provides stretch at convolutions determined by the geometry of the convolutions, and provides rigidity between convolutions determined by the thickness of the bladder and the modulus of reinforcement material in the bladder.

SUMMARY OF THE INVENTION

It is a primary objective of the instant invention to provide a shaped radial tire carcass of improved uniformity. To this end, the instant invention provides an expandible bladder for shaping a pneumatic tire, comprising a substantially cylindrical, thick center section having a multiplicity of thinner convolutions extending perpendicular to the axis of the cylindrical section on the inner surface of said section, said convolutions providing controlled amounts of axial extensibility to the bladder, a pair of annular, beaded end sections extending inwardly from each end of the cylindrical center section, and reinforcing material extending through the center section and end sections to limit the axial extensibility of the bladder.

BRIEF DESCRIPTION OF THE DRAWINGS

FIG. 1 is a sectional view of a bladder in a tire building drum according to the instant invention taken on an axial plane of the bladder.

FIG. 2 is an enlarged, sectional view of the bladder shown in FIG. 1 showing details of the bladder structure.

FIG. 3 is similar to FIG. 1 except it shows the bladder in a pressurized, expanded position for shaping a tire carcass.

FIG. 4 is an enlarged, sectional view of an alternative beaded end section which may be used in the bladder shown in FIG. 1.

DESCRIPTION OF THE PREFERRED EMBODIMENT

In describing the preferred embodiment of the instant invention, reference is made to the drawings, wherein FIG. 1 depicts a shaping bladder generally designated 10 secured on two lateral flanges 12 by means of a pair of rings 14. The bladder 10 comprises a cylindrical center section 16 the middle of which seats on a supporting ring 18 (see FIGS. 1 and 2) when a tire carcass (not shown) is being built thereon, and a pair of annular, beaded end sections 20.

The cylindrical center section 16 is characterized by four identical convolutions or hollows 26, a pair being situated on either side of a central thick portion 28 whose width is approximately double the width of one of the two thick portions 29 separating each pair of the identical convolutions 26. Outwardly spaced from each thick portion 29 and adjacent the outermost convolutions 26 are second thick portions 37 identical to the thick portions 29. The convolutions 26 are, in effect, expansion hollows, which provide additional length in the axial direction of the bladder when the bladder is pressurized, as seen in FIG. 3. A first segment 30 of reinforcing material is situated adjacent the inner surface of liner 31 of the bladder 10 in the cylindrical center section 16 and extends through the interior portion of the beaded end sections 20, and follows the contour of the bladder liner 31 in the cylindrical center section 16. The first segment 30 of reinforcement determines the axial yield or extensibility of the bladder 10, which is limited, for purposes of this specification, to that extensibility which assures adequate support across the full width of the tire when it is expanded to the circumference required for completion and molding. The liner 31 prevents air from entering into the reinforcement when the bladder is pressurized for shaping the tire carcass.

Generally, the reinforcing material 30 will "straighten out" or flatten to provide approximately ½ inch of axial dimension per convolution, so that the four convolutions 26 provide about 2 inches of additional axial dimension, and the two end portions 35 provide about one inch of additional axial dimension. Since the initial width of the tire carcass exceeds the width of the bladder, this expansion or stretching of the bladder is necessary to properly shape the tire. Bands of parallel 1 × 5 × 0.006 inch steel cords 32 are situated in the thick portions 28, 29 and 37, with the cords 32 having their lengths parallel to the bladder axis, and they are spaced from and exterior to the first segment 30 of reinforcing material. The cords 32 add rigidity to the bladder 10, and govern axial extensibility in the area in which tney are situated to a low value, since they are less extensible than the reinforcing material 30.

A second segment 41 of reinforcing material is situated adjacent the liner comprising the inner and outer surface of the beaded end section 20 and follows the contour of said surfaces. The wedge effect created by the design of the reinforcing material 41 together with the design of the beads 24 prevent the end sections 20 from being pulled out from between the flanges 12 and rings 14.

The convolutions 26 permit the bladder 10 to be pressurized, as seen in FIG. 3, without distortion or undue compression of the mass at the inner surface of the bladder 10, which becomes smoother. The outer surface of the bladder will show slight dips 39 at the convolutions 26 on pressurization.

Although natural rubber is preferably used to make the bladder, two different compounds are keyed to specific components of the bladder. The rubber of the center cylindrical section 16, including the liner 31, is compounded to give good mechanical adhesion, when vulcanized, to the carcass of a tire during expansion to require relatively low pressure (10–20 p.s.i.) for inflation, and to have a hardness, preferably, in the range of 29 to 31 on a Shore A durometer. The rubber of the beaded end sections 20 is compounded to give a harder rubber in order to reduce the tendency of the beads 24 to pull out of the flanges 12 and rings 14 when the bladder 10 is inflated. The hardness is, preferably, between about 70 and 75 on a Shore A durometer. Although the compounding ingredients for each rubber are similar, the beaded section rubber is loaded with a high level of carbon black (preferably about 70 parts per 100 parts of rubber) as compared to the center section rubber (preferably about 6 parts of carbon black per 100 parts of rubber). Since the first segment 30 of reinforcing material restricts the axial yield of the bladder 10 while permitting circumferential yield, it is preferably a fibrous material, with the fibers aligned substantially parallel to the axis of the bladder 10.

The reinforcing material in segments 30 and 41 preferably comprises an aramid fiber available under the trademarks "Fiber B" or "Kevlar". Aramid is the generic name for fibers made from the condensation product of isophthalic or terephthalic acid and m- or p-phenylene diamine. "Fiber B" and "Kevlar" are generally understood to be products of the condensation of terephthalic acid and p-phenylenediamine. Aramid is defined as "a manufactured fiber in which the fiber-forming substance is a long-chain synthetic aromatic polyamide in which at least 85% of the amide linkages are attached directly to two aromatic linkages". Further details of the fiber are disclosed in U.S. Pat. No. 3,393,210, incorporated herein by reference.

The preferred cord construction of the reinforcing material is a twist level of 1500/3, 7.2 × 7.2, wherein the fiber is coated with No. 832 rubber stock, 10 ends per inch, with a fabric gage of 0.080 inch.

It should be apparent, that owing to the introduction of controlled stretch at the convolutions 26, the stretch of the substantially cylindrical center section 16 between the convolutions 26 may be very small, even approaching zero. Hence, the thickness of the center section 16 may be made greater than that of conventional shaping bladders. This greater thickness provides desirable firmness when the bladder is expanded and together with a modulus higher than that of the uncured tire carcass being shaped, forces the tire carcass, while it is being expanded, to conform to the profile of the pressurized bladder.

The bladder itself requires about 10–20 p.s.i. for expansion to its shaping diameter (see FIG. 3), and with a first stage tire carcass mounted thereon, about 15–30 p.s.i. This pressure exerted on the bladder provides the carcass with a firm, solid base against which stitching of the breaker and tread band takes place.

In an alternative embodiment of the beaded end section 120, shown in FIG. 4, reinforcing material 160 is situated adjacent to and follows the contour of the inner surface 131 of the bladder in both the cylindrical center section 116 and the beaded end sections 120. Helical coil springs 122, preferably about 5/16 inch in diameter, are built into the beads 124 to provide more resistance to pull-out.

It should be noted that any number, shape and size of convolutions may be employed to achieve the desired amount of axial extensibility and additional thickness in the bladder. For example, bladders with 2, 4 and 6 identical convolutions have been used to yield substantially uniformly shaped radial tire carcasses.

It should also be noted that the bands of steel cords 32, though employed in the preferred embodiment, are not necessary, as they merely serve to augment the effect of the first segment 30 of reinforcing material and further reduce the already small stretch of this material between the convolutions 26.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. An expandable bladder for shaping a pneumatic tire, comprising a thick, substantially cylindrical center section having a multiplicity of convolutions on the inner surface of said section, said convolutions extending perpendicular to the axis of the cylindrical section and thereby providing local reductions in thickness and additional axial extensibility to the bladder;

a pair of annular, beaded end sections extending inwardly from each end of the cylindrical center section; and reinforcing material extending through the center section and end sections to limit the axial extensibility of the bladder.

2. The bladder of claim 1, wherein the reinforcing material comprises a fibrous material which is adjacent to and follows the contour of the inner surface of the bladder in the cylindrical center section and extends through the interior portion of the beaded end sections.

3. The bladder of claim 2, additionally comprising a band of steel cords situated in each of the thick portions of the cylindrical center section, said cords having their lengths parallel to the axis of the bladder and being spaced from and exterior to the reinforcing material in the cylindrical center section.

4. The bladder of claim 2, additionally comprising a second segment of reinforcing material situated adjacent the inner and outer surfaces of the beaded end sections.

5. The bladder of claim 4, wherein there are four identical convolutions, a pair of convolutions being situated on either side of a central thick portion whose width is approximately double the width of one of the two thick portions separating each pair of the identical convolutions.

6. The bladder of claim 5, wherein the cylindrical center section and annular end sections are formed substantially from a natural rubber.

7. The bladder of claim 6, wherein the rubber of the cylindrical center section has a hardness in the range of about 29 to 31 on a Shore A durometer.

8. The bladder of claim 7, wherein the end sections have a hardness between about 70 and 75 on a Shore A durometer.

9. The bladder of claim 1, wherein the reinforcing material comprises a fibrous material which is adjacent to and follows the contour of the inner surface of the bladder in both the cylindrical center section and beaded end sections.

10. The bladder of claim 9, additionally comprising a band of steel cords situated in each of the thick portions of the cylindrical center section, said cords having their lengths parallel to the axis of the bladder and being spaced from and exterior to the reinforcing material in the cylindrical center section.

11. The bladder of claim 10, wherein the cylindrical center section and annular end sections are formed substantially from a natural rubber.

12. The bladder of claim 11, wherein the fibrous material is an aramid fiber.

* * * * *